United States Patent
Bulu et al.

(10) Patent No.: US 12,456,059 B2
(45) Date of Patent: Oct. 28, 2025

(54) DYNAMICALLY PARAMETERIZED MACHINE LEARNING FRAMEWORKS

(71) Applicant: UnitedHealth Group Incorporated, Minnetonka, MN (US)

(72) Inventors: Irfan Bulu, Sartell, MN (US); Gregory D. Lyng, Minneapolis, MN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 978 days.

(21) Appl. No.: 17/484,571

(22) Filed: Sep. 24, 2021

(65) Prior Publication Data

US 2023/0097965 A1    Mar. 30, 2023

(51) Int. Cl.
  *G06N 5/02*   (2023.01)
  *G06N 3/004*  (2023.01)
  *G06N 5/04*   (2023.01)

(52) U.S. Cl.
  CPC ............. *G06N 5/027* (2013.01); *G06N 3/004* (2013.01); *G06N 5/04* (2013.01)

(58) Field of Classification Search
  CPC .......... G06N 5/027; G06N 3/004; G06N 5/04; G06N 3/0455; G06N 3/08
  See application file for complete search history.

(56) References Cited

U.S. PATENT DOCUMENTS

| | | | |
|---|---|---|---|
| 6,246,975 B1 | 6/2001 | Rivonelli et al. | |
| 10,395,772 B1 | 8/2019 | Lucas et al. | |
| 10,445,654 B2 | 10/2019 | Glass et al. | |
| 11,000,236 B2 | 5/2021 | Zhong et al. | |
| 11,763,916 B1 * | 9/2023 | Zamft | G06V 20/188 |
| | | | 702/19 |
| 2014/0113263 A1 | 4/2014 | Jarrell et al. | |
| 2015/0112710 A1 | 4/2015 | Haber et al. | |
| 2016/0196384 A1 * | 7/2016 | Mansi | G16H 50/50 |
| | | | 600/408 |

(Continued)

FOREIGN PATENT DOCUMENTS

| | | | | |
|---|---|---|---|---|
| WO | WO 2019220128 A1 * | 11/2019 | ............. | G06N 3/082 |
| WO | WO 2020113128 A1 * | 6/2020 | ............. | G06N 3/045 |

(Continued)

OTHER PUBLICATIONS

Ha, David et al. "HyperNetworks," arXiv preprint arXiv:1609.09106v4 [cs.LG] Dec. 1, 2016, (29 pages).

(Continued)

*Primary Examiner* — Maikhanh Nguyen
(74) *Attorney, Agent, or Firm* — ALSTON & BIRD LLP

(57) ABSTRACT

Various embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by dynamically parameterized machine learning frameworks, such as a dynamically parameterized machine learning framework comprising an encoder machine learning model that is configured to generate dynamically generated parameters for a target machine learning model of the dynamically parameterized machine learning framework.

17 Claims, 6 Drawing Sheets

(56) References Cited

U.S. PATENT DOCUMENTS

| | | | | |
|---|---|---|---|---|
| 2019/0005195 A1* | 1/2019 | Peterson | ................ | G16H 10/60 |
| 2019/0005200 A1* | 1/2019 | Zimmerman | .......... | G16H 50/30 |
| 2019/0333626 A1 | 10/2019 | Mansi et al. | | |
| 2021/0151187 A1* | 5/2021 | Mansi | .................... | G16H 50/20 |
| 2021/0358640 A1* | 11/2021 | Chaudhary | ............ | G06N 20/00 |
| 2021/0406687 A1 | 12/2021 | Qiao et al. | | |

FOREIGN PATENT DOCUMENTS

| | | |
|---|---|---|
| WO | 2020/224433 A1 | 11/2020 |
| WO | 2020/245727 A1 | 12/2020 |

OTHER PUBLICATIONS

Kernbach, Julius M. et al. "Machine Learning-Based Clinical Prediction Modeling—A Practical Guide For Clinicians," arXiv preprint arXiv:2006.15069, Jun. 23, 2020, (57 pages).

Nguyen, Phuoc et al. "Variational Hyper-Encoding Networks," In Joint European Conference on Machine Learning and Knowledge Discovery in Databases, Sep. 13, 2021 (16 pages). Springer, Cham.

* cited by examiner

DYNAMICALLY PARAMETERIZED MACHINE LEARNING FRAMEWORKS

BACKGROUND

Various embodiments of the present invention address technical challenges related to performing predictive data analysis operations and address the efficiency and reliability shortcomings of existing predictive data analysis solutions.

BRIEF SUMMARY

In general, embodiments of the present invention provide methods, apparatus, systems, computing devices, computing entities, and/or the like for perform predictive data analysis operations. For example, certain embodiments of the present invention utilize systems, methods, and computer program products that perform predictive data analysis operations by dynamically parameterized machine learning frameworks, such as a dynamically parameterized machine learning framework comprising an encoder machine learning model that is configured to generate dynamically generated parameters for a target machine learning model of the dynamically parameterized machine learning framework.

In accordance with one aspect, a method is provided. In one embodiment, the method comprises: determining, using an encoder machine learning model of a dynamically parameterized machine learning framework and based at least in part on a predictive input, one or more dynamically generated parameters for a target machine learning model of the dynamically parameterized machine learning framework; determining, using the target machine learning model and based at least in part on the one or more dynamically generated parameters, a target model output for the predictive input; determining a predictive output based at least in part on the target model output; and performing one or more prediction-based actions based at least in part on the predictive output.

In accordance with another aspect, a computer program product is provided. The computer program product may comprise at least one computer-readable storage medium having computer-readable program code portions stored therein, the computer-readable program code portions comprising executable portions configured to: determine, using an encoder machine learning model of a dynamically parameterized machine learning framework and based at least in part on a predictive input, one or more dynamically generated parameters for a target machine learning model of the dynamically parameterized machine learning framework; determine, using the target machine learning model and based at least in part on the one or more dynamically generated parameters, a target model output for the predictive input; determine a predictive output based at least in part on the target model output; and perform one or more prediction-based actions based at least in part on the predictive output.

In accordance with yet another aspect, an apparatus comprising at least one processor and at least one memory including computer program code is provided. In one embodiment, the at least one memory and the computer program code may be configured to, with the processor, cause the apparatus to: determine, using an encoder machine learning model of a dynamically parameterized machine learning framework and based at least in part on a predictive input, one or more dynamically generated parameters for a target machine learning model of the dynamically parameterized machine learning framework; determine, using the target machine learning model and based at least in part on the one or more dynamically generated parameters, a target model output for the predictive input; determine a predictive output based at least in part on the target model output; and perform one or more prediction-based actions based at least in part on the predictive output.

BRIEF DESCRIPTION OF THE DRAWINGS

Figure 1:
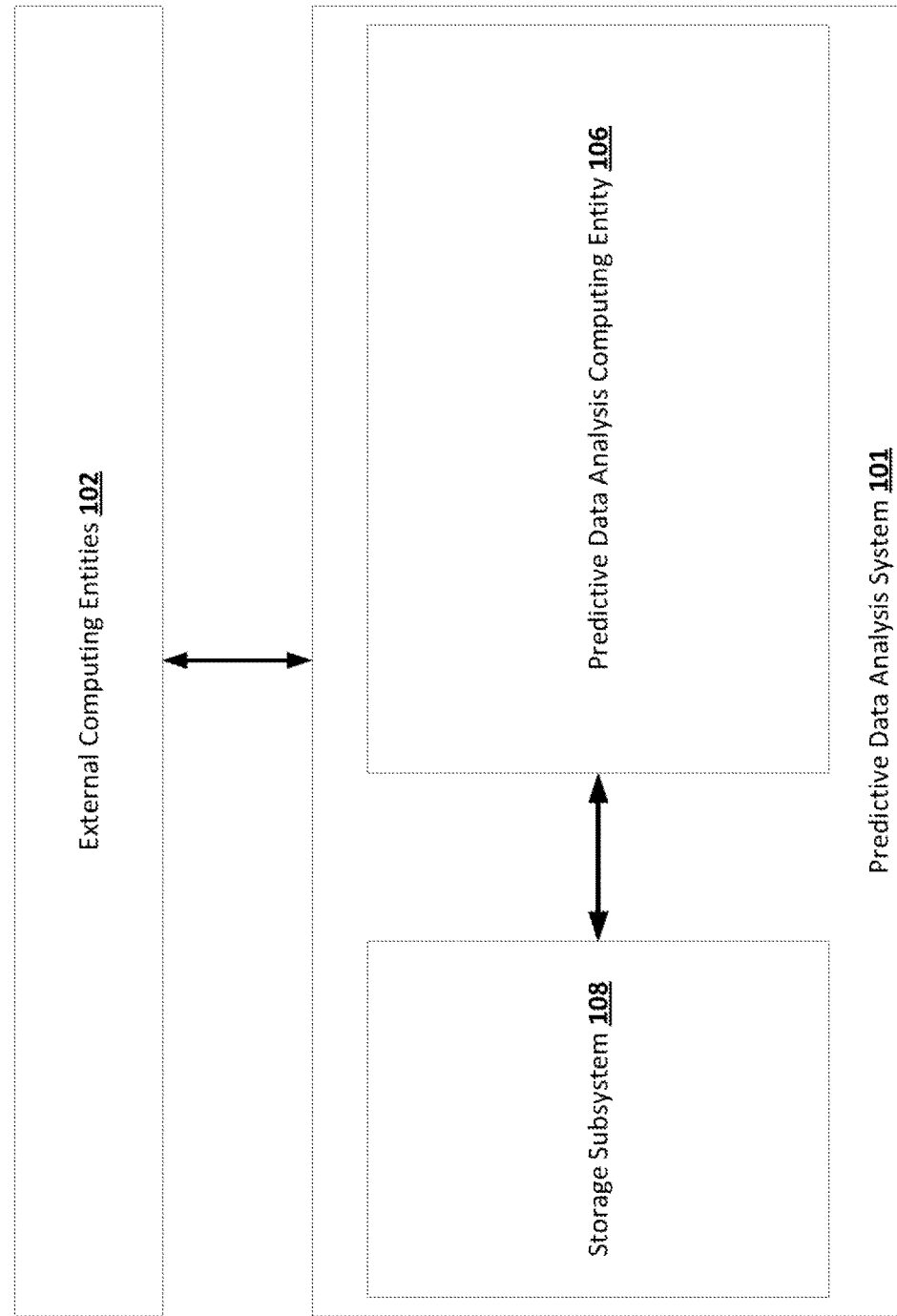

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
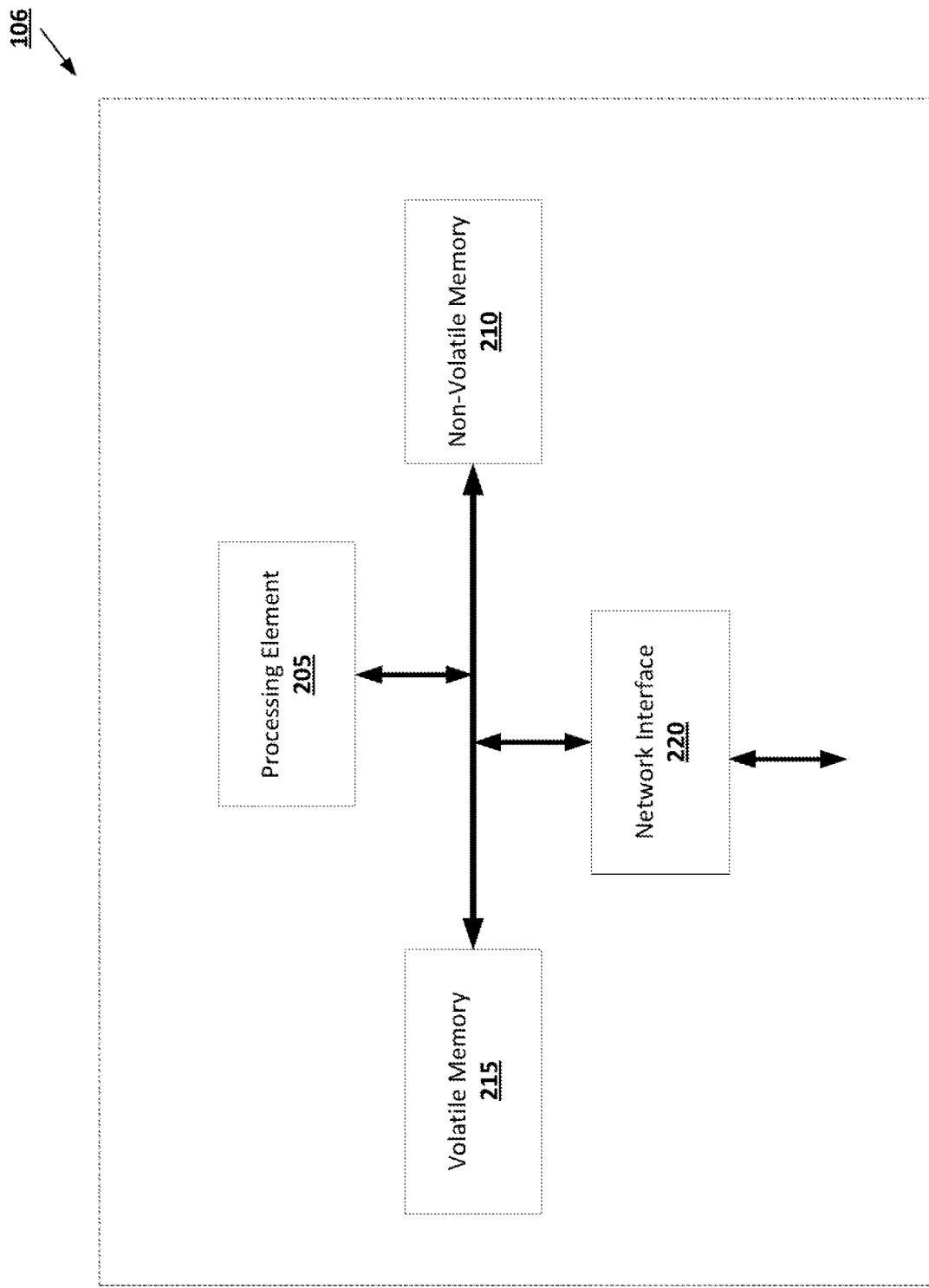

FIG. 2 provides an example predictive data analysis computing entity in accordance with some embodiments discussed herein.

Figure 3:
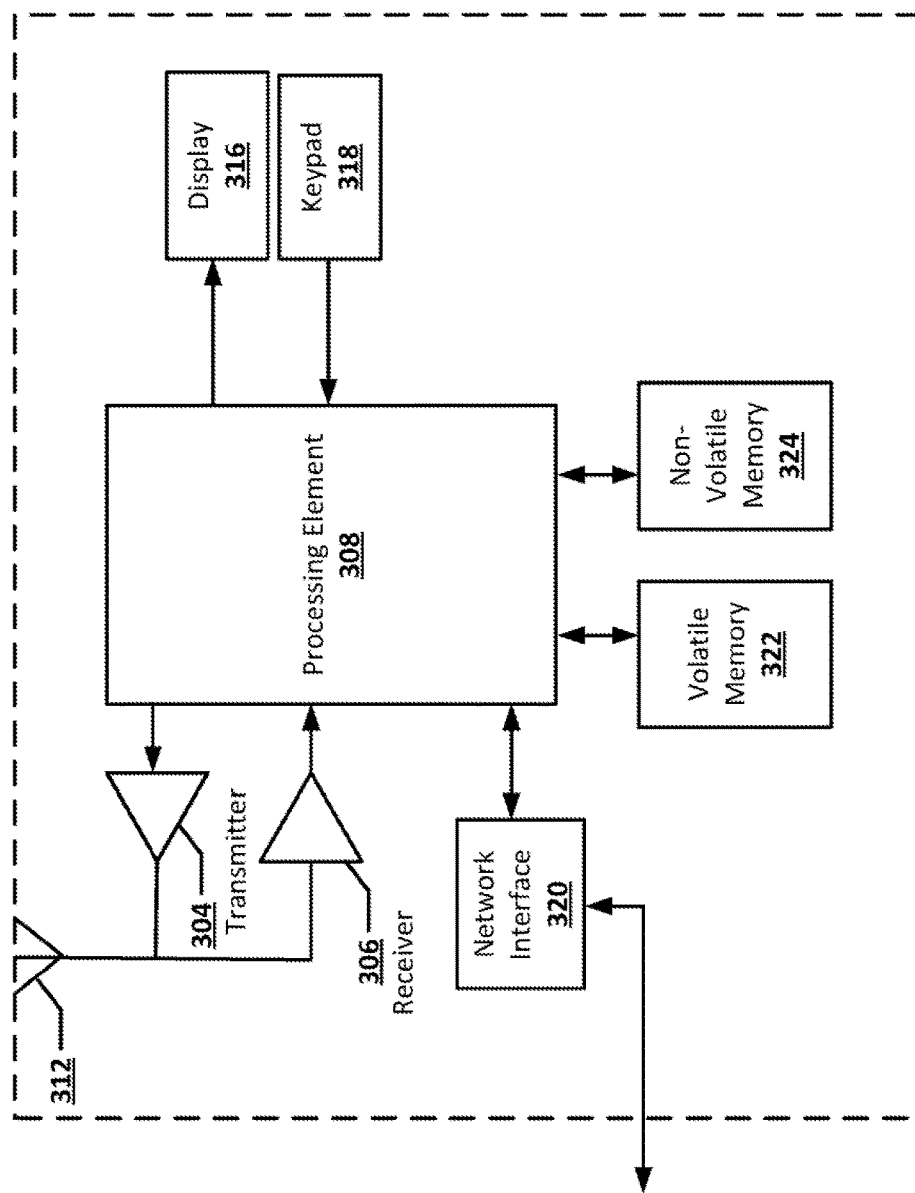

FIG. 3 provides an example client computing entity in accordance with some embodiments discussed herein.

Figure 4:
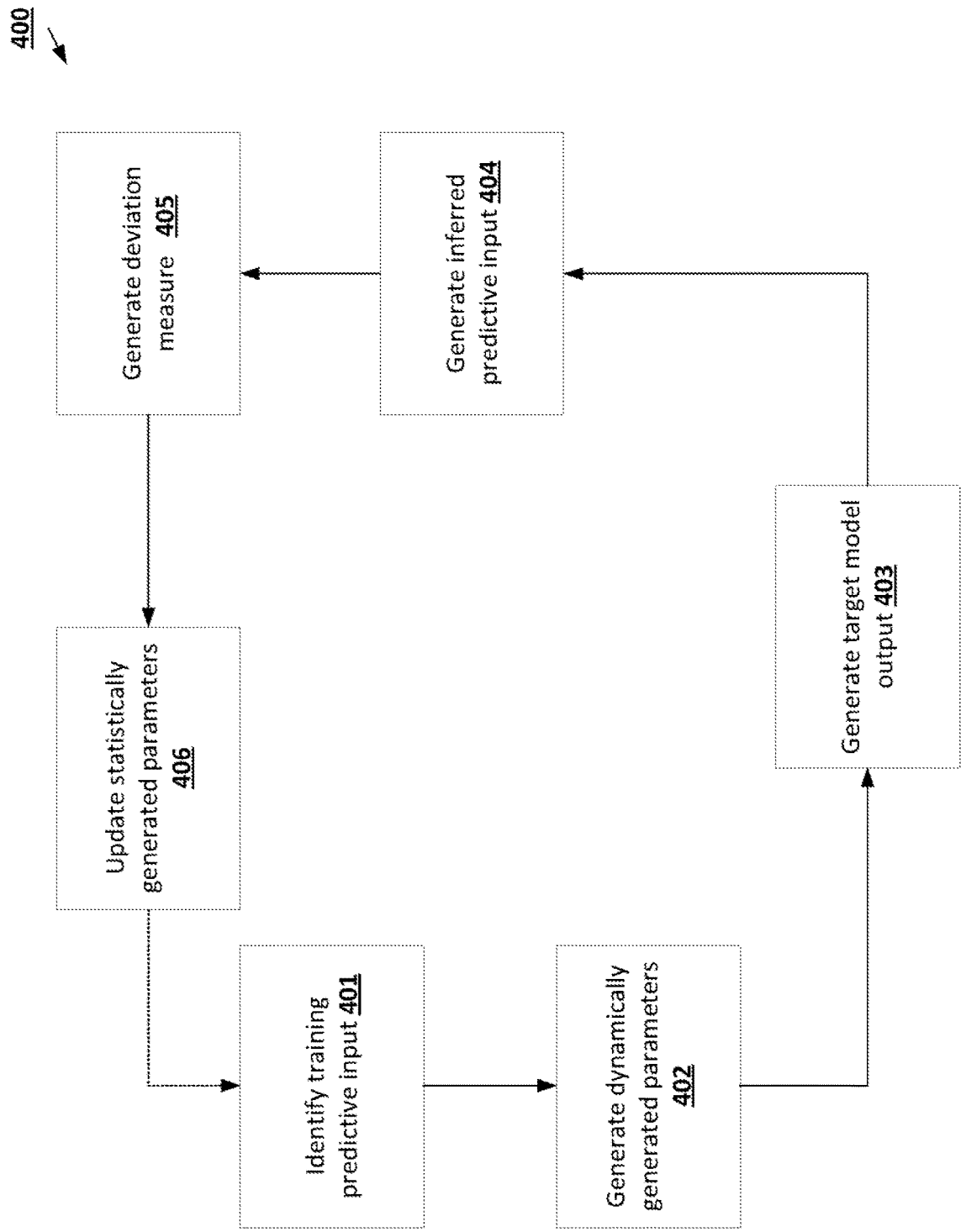

FIG. 4 is a flowchart diagram of an example process for generating a dynamically parameterized machine learning framework in accordance with some embodiments discussed herein.

Figure 5:
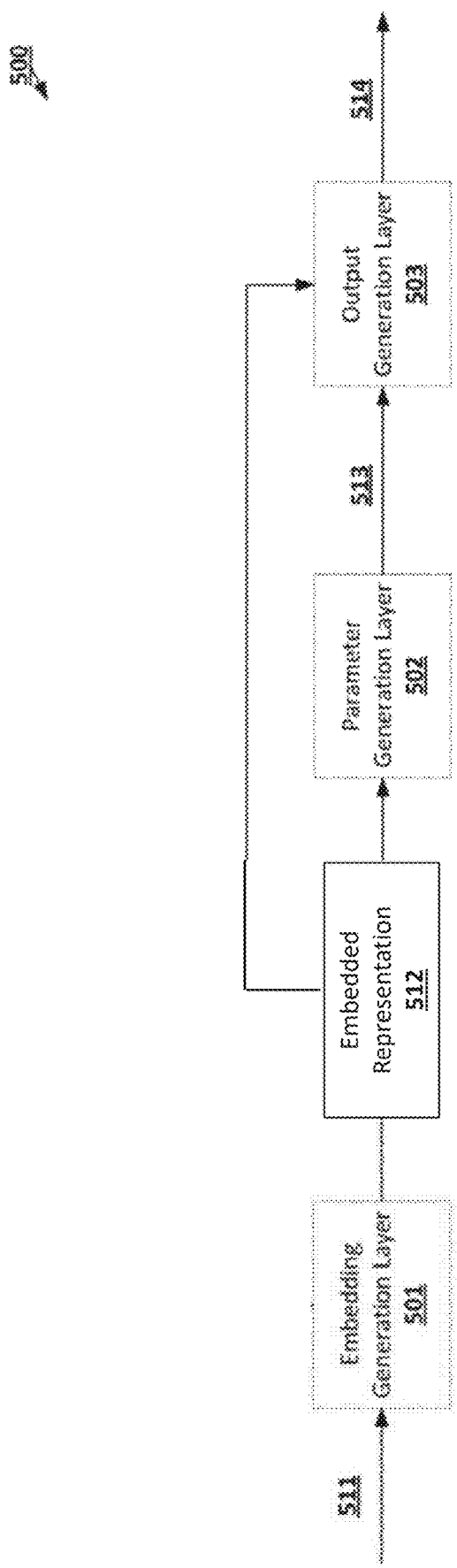

FIG. 5 provides an operational example of an encoder machine learning model of a dynamically parameterized machine learning model in accordance with some embodiments discussed herein.

Figure 6:
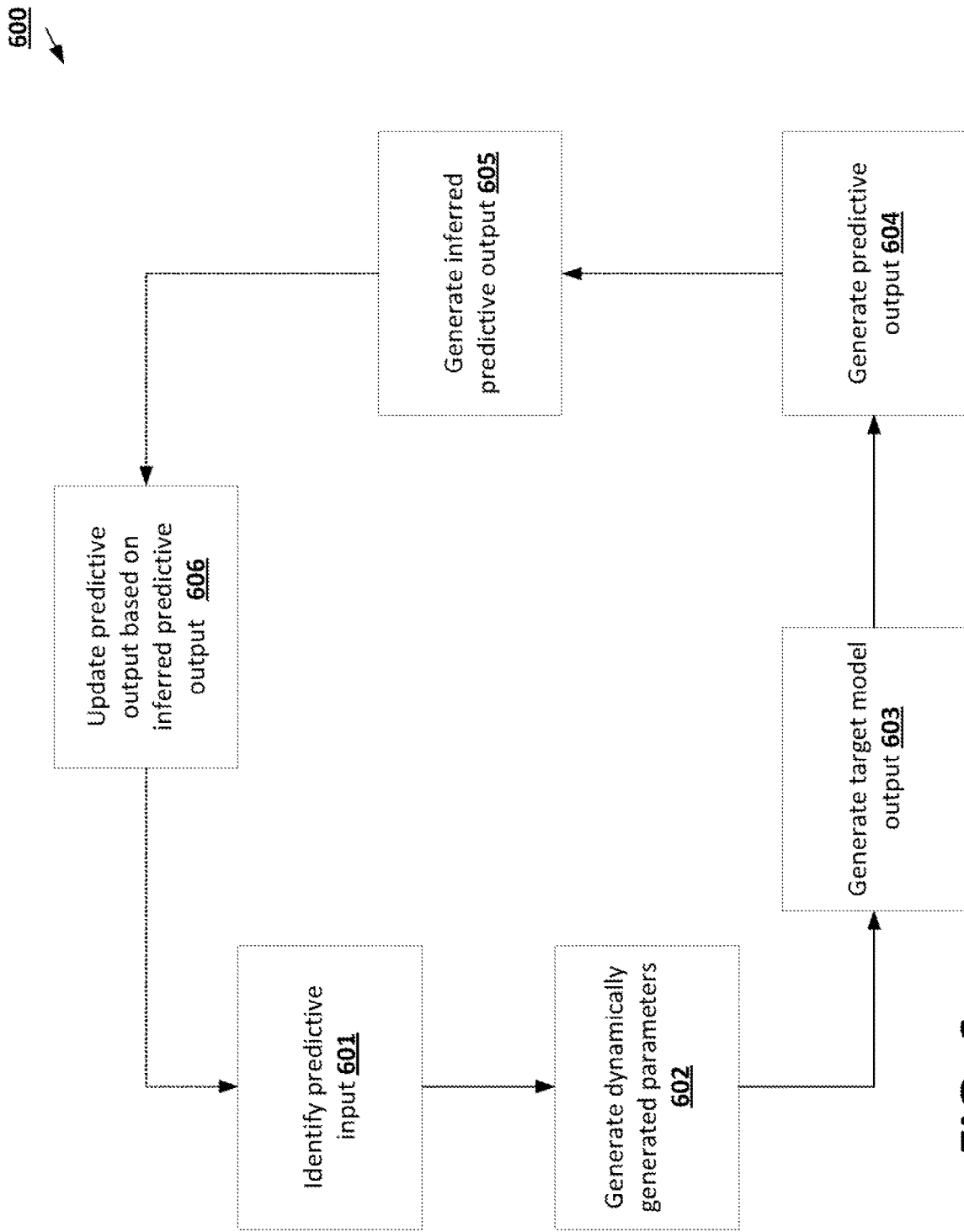

FIG. 6 is a flowchart diagram of an example process for performing one or more predictive inference operations using a dynamically parameterized machine learning framework in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Technical Improvements

Various embodiments of the present invention address technical challenges associated with efficiency and effectiveness of performing biometric/biosimulator predictive data analysis, and enable performing biometric/biosimulator predictive data analysis with a dynamically generated model that is able to capture the predictive behavior multiple machine learning models via using dynamically generated parameters as part of the computations of the noted dynamically generated model. Accordingly, by reducing the number of machine learning models that should be utilized to perform effective biometric/biosimulator predictive data analysis in relation to prediction windows having diverse user activity profiles, various embodiments of the present invention both: (i) improve the computational complexity of performing biometric/biosimulator predictive data analysis by reducing the need for parallel implementation of multiple machine learning models as well as normalizing the outputs of multiple machine learning models, and (ii) reduce the storage costs of performing biometric/biosimulator predictive data analysis by eliminating the need to store model definition data (e.g., model parameter data and/or model hyper-parameter data) for multiple machine learning models. Accordingly, by addressing the technical challenges associated with efficiency and effectiveness of performing biometric/biosimulator predictive data analysis, various embodiments of the present invention make substantial technical contributions to improving efficiency and effectiveness of performing biometric/biosimulator predictive data analysis and to the field of predictive data analysis generally.

An exemplary application of various embodiments of the present invention relates to estimating parameters of models called biosimulators. Biosimulators may predict observable outcomes of a broad range of biological systems encompassing, for example, models of physiological systems as well as epidemiological models of disease spread. Biosimulators may be valuable to payers as well as providers and researchers due to their ability to predict health states both at the individual and population levels. Biosimulators may be expressed as systems of differential equations. These differential equations comprise variables and parameters. Variables may be of two types. Input variables provide the model with information about the conditions in which the model is being applied and may be expected to change over time or under different circumstances. Output variables may be those measurements predicted by the model. In addition to variables, models also comprise parameters. A parameter may be a value that, once established, is expected to remain relatively stable regardless of the input variables entered into the model. For models that are biosimulators, parameters, as well as the biosimulator outputs themselves, may be attributes of interest.

For example, a biosimulator may be designed to predict glucose levels of an individual through time as a function of input variables that quantify activities such as carbohydrate consumption and physical activity. The output of the model may be a predicted glucose level of the individual at a given time. Parameters of the model may include more stable physiological attributes of the individua such as insulin sensitivity (the amount or rate of glucose uptake triggered by a particular level of insulin) and beta cell capacity (the maximum amount of or rate at which insulin can be produced by the individua's pancreatic beta cells). Insulin sensitivity and beta cell capacity may be relevant to issues such as progression towards and treatment of diabetes. Insulin sensitivity and beta cell capacity may change gradually over time, but not as quickly as variables such as carbohydrate consumption and exercise. For a given prediction, the biosimulator keeps insulin sensitivity and beta cell capacity fixed.

The parameters for biosimulators may be difficult and expensive to determine. To continue with the glucose biosimulator example, determining parameters from intravenous glucose clamp tests is expensive, time-consuming, and extremely uncomfortable for those who undergo the procedure. The difficulty and expense lead to parameters that may be determined with limited sample sizes. Additionally, the parameters may not be representative of individuals who have not undergone the clamp test. Mathematical techniques that attempt to determine numerous parameters by fitting to data samples often yield too many possible solutions (each a combination of parameters) to determine which, if any are the actual parameter values.

Various embodiments of the present invention propose that parameters for biosimulators may be determined from natural language documents such as medical records, claims data, and similar health data (collectively referred to herein as "health data"). Health data may comprise any data that could be used to determine biosimulator parameters using methods described herein. Some embodiments may use, for example, cell phone location data as a type of health data. The health data would be used both to generate the inputs for the biosimulator (including both input variables and parameters) and as a method for determining the accuracy of biosimulator outputs (as well as associated biosimulator parameters determining the outputs). Various embodiments of the present invention use an encoder and decoder to mediate between the health data and the biosimulator. The encoder may be a neural network that uses the health data as an input and generates biosimulator input variables and parameters as outputs. The decoder may be a second neural network that, in turn, uses the outputs of the biosimulator to generate a prediction of the original health data.

In some embodiments, in the training phase of the method, the goal is to train the encoder to accurately predict the parameters of the biosimulator using health data as inputs. The decoder serves as an automated check to determine the accuracy of the outputs of the biosimulator. Poor tuning of either the encoder or decoder could generate inaccurate decoder outputs. For this reason, the encoder and decoder may be trained in concert so that, together, they generate the closest possible recreation of the health data. During the training phase, the encoder and decoder may be trained on the data of multiple (likely a very large numbers of) individuals. However, for any one iteration of the training phase, only the health data of a single individual is processed by the encoder and decoder. A subsequent iteration may process the health data of a different individual. The health data of one individual may be processed in multiple iterations of the training phase as the parameters of the biosimulator may be refined for that individual. Training may continue, for example, until a given level of encoder-decoder accuracy is reached or a predetermined number of individuals' health data has been processed.

In some embodiments, once the encoder and decoder have been trained, the encoder processes the health data of an individual for whom an estimate of a biosimulator parameter or output is desired. In some embodiments, the trained encoder may generate the biosimulator parameters directly from the individual's health data in a single operation.

An exemplary embodiment of the present invention comprising a training phase and an execution/phase is described in this paragraph. In the training phase, a database that comprises health data of multiple individuals is queried. The health data of one of the multiple individuals is received by an untrained encoder comprising a first neural network. The encoder generates both parameters and input variables for a biosimulator. The biosimulator processes the inputs to yield an output of one or more measures. A decoder then generates a prediction of the health data for the individual. Processing then compares the predicted health data to the actual health data. The comparison may inform the training of encoder and decoder. The comparison may also determine whether the training phase continues for another iteration or whether the encoder and decoder have been trained sufficiently to be used in execution phase. The training phase may repeat multiple times for the health data of a first individual in the health database until the outputs of the decoder reach a first threshold of accuracy. The training phase may then iterate on the health data of a second individual, and so forth. The encoder and the decoder are trained in concert to yield the most accurate outputs of the decoder across multiple individuals. When the training phase has completed enough repetitions to train the encoder and decoder to the desired levels of accuracy and/or process the data of a given number of individuals, the method then progresses to an execution phase. The health data of an individual is received by a trained encoder comprising the first neural network. Trained encoder is the result of training encoder in the training phase. The trained encoder generates both parameters and input variables for the biosimulator. The biosimulator processes the inputs to yield an output of one or more measures. A trained decoder then generates a prediction of the health data for the individual. Trained decoder is the result of training decoder in the training phase. Processing then compares the predicted health data to the actual health data. The comparison may inform subsequent determination of parameters for biosimulator. The comparison may also determine whether the execution phase continues for another iteration. The execution phase may repeat multiple times for the health data of the individual until the outputs of the trained decoder reach some threshold of accuracy as determined by the comparison. When the threshold level of accuracy is achieved, the parameters or outputs of the biosimulator are recorded or otherwise used.

II. Definitions

The term "dynamically parameterized machine learning framework" may refer to a data construct that is configured to parameters, hyper-parameters, and/or defined operations of a combination of one or more machine learning models, where the combination is collectively configured to generate a predictive output for a predictive input using a set of dynamically generated parameters. In some embodiments, the dynamically parameterized machine learning framework is a machine learning framework having a set of statistically generated parameters (e.g., a set of statistically generated parameters for an encoder machine learning model of the dynamically parameterized machine learning framework, a set of statistically generated parameters for a decoder machine learning model of the dynamically parameterized machine learning framework, and/or the like) and a set of dynamically generated parameters (e.g., a set of dynamically generated parameters for a target machine learning model of the dynamically parameterized machine learning framework). In some of the noted embodiments, training a dynamically parameterized machine learning framework comprises updating/setting values of the statistically generated parameters of the dynamically parameterized machine learning framework without updating/setting values of the dynamically generated parameters of the dynamically parameterized machine learning framework, which may be determined during an inference performed by the dynamically parameterized machine learning framework. In some embodiments, a dynamically parameterized machine learning framework comprises an encoder machine learning model characterized at least in part by one or more statistically generated parameters, a target machine learning model characterized at least in part by one or more dynamically generated parameters, and a decoder machine learning model characterized at least in part by one or more statistically generated parameters. In some embodiments, inputs to a dynamically parameterized machine learning framework comprise one or more predictive input vectors and/or one or more predictive input values, while outputs of a dynamically parameterized machine learning framework comprise a predictive output vector and/or a predictive output value.

The term "encoder machine learning model" may refer to a data construct that is configured to parameters, hyper-parameters, and/or defined operations of a machine learning model that is configured to process a predictive input in order to generate an encoder model output for the predictive input that comprises one or more dynamically generated parameters for a target machine learning model of a dynamically parameterized machine learning framework that comprises the encoder machine learning model. In some embodiments, the encoder model output of the encoder machine learning model comprises an embedded representation of the predictive input and one or more dynamically generated parameters for the target machine learning model of the dynamically parameterized machine learning framework. In some of the noted embodiments, both the embedded representation and the one or more dynamically generated parameters are provided to the target machine learning model. As described above, the encoder machine learning model may be configured to process a predictive input (e.g., a training predictive input) to generate an embedded representation of the predictive input and one or more dynamically-generated parameters for the predictive input. Thus, the encoder machine learning model may in some embodiments two distinct functionalities: an embedding generation functionality and a real-time parameter generation functionality. Accordingly, in some embodiments, the encoder machine learning model may comprise an embedding generation layer followed by a parameter generation layer. In inputs to an encoder machine learning model comprise one or more predictive input vectors and/or one or more predictive input values, while outputs of an encoder machine learning model comprise an embedded representation vector and a parameter vector describing one or more dynamically generated parameters of the target machine learning model of a dynamically parameterized machine learning framework that comprises the encoder machine learning model.

The term "target machine learning model" may refer to a data construct that is configured to parameters, hyper-parameters, and/or defined operations of a machine learning model that is configured to generate, based an embedded representation of a predictive input and using parameters that are determined based at least in part on the dynamically generated parameters provided by an encoder machine learning model of a dynamically parameterized machine learning framework that comprises the target machine learning model, a target model output. In some embodiments, the target machine learning model is a model characterized by a set of inputs and a set of parameters, where the set of inputs are determined based at least in part on the embedded representation that is generated by the encoder machine learning model and the set of parameters are determined based at least in part on the dynamically generated parameters that are generated by the encoder machine learning model. In some embodiments, the target machine learning model comprises a set of differential equation sub-models (e.g., each characterized by a differential equation term), where each differential equation sub-model takes at least one or more input features determined based at least in part on the embedded representation that is generated by the encoder machine learning model, and where each differential equation sub-model is characterized by a set of parameters that are determined based at least in part on a subset of the dynamically generated parameters that are generated by the encoder machine learning model. In some embodiments, the target machine learning model comprises a biosimulator machine learning model, and the predictive output comprises a predicted biometric measurement for a monitored individual that is associated with the predictive input. In some embodiments, biosimulator machine learning models, which are also referred to herein as "biosimulators" predict observable outcomes of a broad range of biological systems encompassing, for example, models of physiological systems as well as epidemiological models of disease spread. In some embodiments, inputs to a target machine learning model comprise an embedded representation vector and a parameter vector describing dynamically generated parameters of the target machine learning model, while outputs of a target machine learning model comprise one or more target model output vectors that are generated by the target machine learning model.

The term "target model output" may refer to a data construct that is configured to describe one or more values that are generated by a target machine learning model of a dynamically parameterized machine learning framework, where the generated values may be provided to a decoder machine learning model of the dynamically parameterized machine learning framework during training of the dynamically parameterized machine learning framework. In some embodiments, the target model output of a target machine learning model may be determined based at least in part on one or both of the output values provided by the target machine learning model and/or one or more optimizable parameters of the target machine learning model. For example, in some embodiments, a target machine learning model (e.g., or a sub-model of a target machine learning model) may be characterized by one or more dynamically generated parameters that are provided by the encoder machine learning model and one or more optimizable parameters that are generated by solving a system of differential equations based at least in part on the dynamically generated parameters as well as input features inferred based at least in part on the embedded representation provided by the encoder machine learning model. In some of the noted embodiments, the optimizable parameters may be at least a part of the target model output of the target machine learning model.

The term "decoder machine learning model" may refer to a data construct that is configured to parameters, hyperparameters, and/or defined operations of a machine learning model that is configured to generate, based at least in part on the target model output of a target machine learning model of a dynamically parameterized machine learning framework, a decoder model output, where the decoder model output may comprise an inferred predictive input for a predictive input that is provided as an input to the dynamically parameterized machine learning framework. For example, the decoder machine learning model may be configured to process input features extracted from the target model output (and/or from the embedded representation of the predictive input, in some embodiments) using one or more statistically generated parameters and/or one or more dynamically generated parameters of the decoder machine learning model in order to generate the inferred predictive input, which may be a predictively reconstructed version of the inferred predictive input. For example, if the predictive input comprises a recorded biometric feature (e.g., a recorded blood pressure feature) for a monitored individual, the inferred predictive input may comprise a predicted biometric feature (e.g., a predicted blood pressure feature) for the monitored individual that is determined based at least in part on input features of the decoder machine learning model. In some embodiments, during a predictive inference, a computing entity determines a deviation measure for the inferred predictive input and the predictive input, determines whether the deviation measure satisfies a deviation measure threshold, and, in response to determining that the framework validation score satisfies the framework score threshold, determines the predictive output based at least in part on the target model output. As another example, in some embodiments, a computing entity determines a deviation measure for the inferred predictive input and the predictive input, determines whether the deviation measure satisfies a deviation measure threshold, and, in response to determining that the framework validation score fails to satisfy the framework score threshold, does not determine the predictive output based at least in part on the target model output and sets a null value for the predictive output.

The term "predictive input" may refer to a data construct that is configured to describe a combination of one or more input features that are provided as inputs to a dynamically parameterized machine learning framework. In some embodiments, when a predictive input is used as part of a training routine for the dynamically parameterized machine learning framework, then the predictive input is referred to herein as a "training predictive input." In some embodiments, the input features of a predictive input may include one or more health data features of a particular individual/patient, where the health data features can be extracted from natural language documents such as medical records, claims data, and similar health data; from one or more biometric sensors associated with the particular individual/patient, and/or the like. In some embodiments, training of a dynamically parameterized machine learning framework is performed using a deviation measure that is defined based at least in part on a similarity measure for a predictive input and for an inferred predictive input that is determined based at least in part on the output of processing the predictive input using the dynamically parameterized machine learning framework. In some embodiments, once trained, the dynamically parameterized machine learning framework is configured to process a predictive input in order to generate a predictive output (e.g., based at least in part on a target model output of a target machine learning model of the dynamically parameterized machine learning framework, based at least in part on a decoder model output of a decoder machine learning model of the dynamically parameterized machine learning framework, and/or the like).

The term "glucose-insulin prediction" may refer to a data construct that is configured to describe an inferred conclusion about one or more functional properties of the glucose-insulin endocrine metabolic regulatory system of a corresponding monitored end-user. For example, the glucose-insulin prediction may describe a measure of pancreatic response to accelerate insulin production and insulin secretion in response to increase of glucose concentrations for the corresponding monitored end-user. As another example, the glucose-insulin prediction may describe a maximal measure of insulin production and insulin secretion for the corresponding monitored end-user. As yet another example, the glucose-insulin prediction may describe the combination of an estimated rate of change of the glucose concentration of the corresponding monitored end-user at a particular point in time and an estimated rate of change of the insulin concentration of the corresponding monitored end-user at the particular point in time. As a further example, the glucose-insulin prediction may describe a measure of sensitivity of the liver cells and the muscle/fat cells of the corresponding monitored end-user to performing glucose uptake in response to secretion of insulin by β-cells in pancreas.

The term "dynamically generated parameter" may refer to a data construct that is configured to a parameter of a machine learning model whose value is updated both during the training of the machine learning model and subsequent to the training of the machine learning when the trained machine learning model is utilized to perform one or more predictive inferences. Unlike a statistically generated parameter of a machine learning model whose value is determined during the training and is then fixed when performing predictive inferences using the trained machine learning model, the value of a dynamically generated parameter is not fixed after training. In fact, in at least some embodiments, a dynamically generated parameter does not have a default/preset value subsequent to training of a machine learning model, as the value of the dynamically generated value is generated during each processing iteration of the machine learning model, whether this processing iteration is a training processing iteration or an inferential processing iteration with a trained machine learning model. For example, in some embodiments, the target machine learning model of the dynamically parameterized machine learning framework is associated with a set of dynamically generated parameters that are generated, during each processing iteration of the dynamically parameterized machine learning framework, by the encoder machine learning model of the dynamically parameterized machine learning framework. This means that, for example, during a training iteration for a training predictive input, the encoder machine learning model processes the training predictive input to generate a set of dynamically generated parameters for the training predictive input. Similarly, during an inferential iteration for a post-training predictive input that is performed using a trained dynamically parameterized machine learning framework, the encoder machine learning model processes the post-training predictive input using the encoder machine learning model to generate a set of dynamically generated parameters for the post-training predictive input.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating a glucose-insulin prediction and performing one or more insulin delivery actions based at least in part on the glucose-insulin prediction.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity— relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Provided below are exemplary techniques for generating a dynamically parameterized machine learning framework and for using a trained dynamically parameterized machine learning framework to perform one or more predictive inferences. However, while various embodiments of the present invention describe the model generation operations described herein and the predictive inference operations described herein as being performed by the same single computing entity, a person of ordinary skill in the relevant technology will recognize that each of the noted sets of operations described herein can be performed by one or more computing entities that may be the same as or different from the one or more computing entities used to perform each of the other sets of operations described herein.

As described below, various embodiments of the present invention address technical challenges associated with efficiency and effectiveness of performing biometric/biosimulator predictive data analysis, and enable performing biometric/biosimulator predictive data analysis with a dynamically generated model that is able to capture the predictive behavior multiple machine learning models via using dynamically generated parameters as part of the computations of the noted dynamically generated model. Accordingly, by reducing the number of machine learning models that should be utilized to perform effective biometric/biosimulator predictive data analysis in relation to prediction windows having diverse user activity profiles, various embodiments of the present invention both: (i) improve the computational complexity of performing biometric/biosimulator predictive data analysis by reducing the need for parallel implementation of multiple machine learning models as well as normalizing the outputs of multiple machine learning models, and (ii) reduce the storage costs of performing biometric/biosimulator predictive data analysis by eliminating the need to store model definition data (e.g., model parameter data and/or model hyper-parameter data) for multiple machine learning models. Accordingly, by addressing the technical challenges associated with efficiency and effectiveness of performing biometric/biosimulator predictive data analysis, various embodiments of the present invention make substantial technical contributions to improving efficiency and effectiveness of performing biometric/biosimulator predictive data analysis and to the field of predictive data analysis generally.

Model Generation Operations

FIG. 4 is a flowchart diagram of an example process 400 for training a dynamically parameterized machine learning framework. Via the various steps/operations of the process 400, the predictive data analysis computing entity 106 can generate a machine learning framework having a set of statistically generated parameters (e.g., a set of statistically generated parameters for an encoder machine learning model of the dynamically parameterized machine learning framework, a set of statistically generated parameters for a decoder machine learning model of the dynamically parameterized machine learning framework, and/or the like) and a set of dynamically generated parameters (e.g., a set of dynamically generated parameters for a target machine learning model of the dynamically parameterized machine learning framework). In some of the noted embodiments, training a dynamically parameterized machine learning framework comprises updating/setting values of the statistically generated parameters of the dynamically parameterized machine learning framework without updating/setting values of the dynamically generated parameters of the dynamically parameterized machine learning framework, which may be determined during an inference performed by the dynamically parameterized machine learning framework. In some embodiments, the process 400 is repeated through a number of iterations, with each iterations receiving a batch of one or more training predictive inputs.

The process 400 begins at step/operation 401 when the predictive data analysis computing entity 106 identifies (e.g., receives) a training predictive input. While various embodiments of the process 400 are described herein with reference to a single training predictive input, a person of ordinary skill in the relevant technology will recognize that: (i) a batch of n training predictive inputs may be utilized to train the dynamically parameterized machine learning framework, and (ii) when a batch of more than one training predictive inputs are utilized to train the dynamically parameterized machine learning framework, training the dynamically parameterized machine learning framework can in some embodiments be performed using at least one of batch gradient descent or stochastic gradient descent. For example, in some embodiments, given n training predictive inputs where n>=1, training the dynamically parameterized machine learning framework can be performed by updating statistically generated parameters of the dynamically parameterized machine learning framework using in order to optimize one deviation measure (e.g., one error function) for all of the n training predictive inputs, or by updating statistically generated parameters of the dynamically parameterized machine learning framework using in order to optimize n deviation measures (e.g., n error functions) comprising a deviation measure for each of the n training predictive inputs.

In some embodiments, a predictive input describes a combination of one or more input features that are provided as inputs to a dynamically parameterized machine learning framework. In some embodiments, when a predictive input is used as part of a training routine for the dynamically parameterized machine learning framework, then the predictive input is referred to herein as a "training predictive input." In some embodiments, the input features of a predictive input may include one or more health data features of a particular individual/patient, where the health data features can be extracted from natural language documents such as medical records, claims data, and similar health data; from one or more biometric sensors associated with the particular individual/patient, and/or the like. In some embodiments, training of a dynamically parameterized machine learning framework is performed using a deviation measure that is defined based at least in part on a similarity measure for a predictive input and for an inferred predictive input that is determined based at least in part on the output of processing the predictive input using the dynamically parameterized machine learning framework. In some embodiments, once trained, the dynamically parameterized machine learning framework is configured to process a predictive input in order to generate a predictive output (e.g., based at least in part on a target model output of a target machine learning model of the dynamically parameterized machine learning framework, based at least in part on a decoder model output of a decoder machine learning model of the dynamically parameterized machine learning framework, and/or the like).

At step/operation 402, the predictive data analysis computing entity 106 processes the training predictive input using an encoder machine learning model of the dynamically parameterized machine learning framework in order to generate an encoder model output for the training predictive input that comprises one or more dynamically generated parameters for a target machine learning model of the dynamically parameterized machine learning framework. In some embodiments, the encoder model output of the encoder machine learning model comprises an embedded representation of the training predictive input and one or more dynamically generated parameters for the target machine learning model of the dynamically parameterized machine learning framework. In some of the noted embodiments, both the embedded representation and the one or more dynamically generated parameters are provided to the target machine learning model.

A dynamically generated parameter may be a parameter of a machine learning model whose value is updated both during the training of the machine learning model and subsequent to the training of the machine learning when the trained machine learning model is utilized to perform one or more predictive inferences. Unlike a statistically generated parameter of a machine learning model whose value is determined during the training and is then fixed when performing predictive inferences using the trained machine learning model, the value of a dynamically generated parameter is not fixed after training. In fact, in at least some embodiments, a dynamically generated parameter does not have a default/preset value subsequent to training of a machine learning model, as the value of the dynamically generated value is generated during each processing iteration of the machine learning model, whether this processing iteration is a training processing iteration or an inferential processing iteration with a trained machine learning model.

For example, in some embodiments, the target machine learning model of the dynamically parameterized machine learning framework is associated with a set of dynamically generated parameters that are generated, during each processing iteration of the dynamically parameterized machine learning framework, by the encoder machine learning model of the dynamically parameterized machine learning framework. This means that, for example, during a training iteration for a training predictive input, the encoder machine learning model processes the training predictive input to generate a set of dynamically generated parameters for the training predictive input. Similarly, during an inferential iteration for a post-training predictive input that is performed using a trained dynamically parameterized machine learning framework, the encoder machine learning model processes the post-training predictive input using the encoder machine learning model to generate a set of dynamically generated parameters for the post-training predictive input.

In some embodiments, the parameters of the target machine learning model of the dynamically parameterized machine learning framework are dynamically generated, while at least one of the parameters of the decoder model of the dynamically parameterized machine learning framework or the parameters of the encoder model of the dynamically parameterized machine learning framework. Accordingly, in some of the noted embodiments, the parameters of the encoder machine learning model and the parameters of the decoder machine learning model are fixed after training of the dynamically parameterized machine learning framework, while the parameters of the target machine learning model are inferred during each processing iteration of the dynamically parameterized machine learning framework regardless of whether the processing iteration is a training processing iteration or an inferential machine learning model.

As described above, the encoder machine learning model may be configured to process a predictive input (e.g., a training predictive input) to generate an embedded representation of the predictive input and one or more dynamically-generated parameters for the predictive input. Thus, the encoder machine learning model may in some embodiments two distinct functionalities: an embedding generation functionality and a real-time parameter generation functionality. The embedding generation functionality of the encoder machine learning model may comprise generating a per-feature embedded representation for each input feature of the predictive input and then combining (e.g., concatenating, adding, averaging, and/or the like) the per-feature embedded representations for the input features of the predictive input in order to generate the embedded representation of the predictive input. In some embodiments, if a particular input feature is a natural language feature, then generating the per-feature embedded representation of the particular input feature comprises processing the particular input feature using a language model layer of the encoder machine learning model and generating the per-feature embedded representation of the particular input feature based at least in part on a language model layer output of the language model layer, where the language model may comprise at least one of a Word2Vec mechanism, a Paragraph2Vec mechanism, a Bidirectional Encoder Representations from Transformers (BERT) mechanism, a Long Short Term Memory (LSTM) mechanism, and/or the like. In some embodiments, if a particular input feature is a categorical feature, then generating the per-feature embedded representation of the particular input feature comprises generating a one-hot-coded representation of the particular input feature.

The real-time parameter generation functionality of the encoder machine learning model may in some embodiments comprises processing the per-feature embedded representations of the input features of a predictive input features using one or more machine learning layers (e.g., one or more dense machine learning layers, one or more fully connected machine learning layers, and/or the like) to generate the one or more dynamically generated parameters for the target machine learning model of the dynamically parameterized machine learning framework based at least in part on the output of the noted machine learning layers. The real-time parameter generation functionality of the encoder machine learning model may in some embodiments comprises processing the embedded representations of a predictive input features using one or more machine learning layers (e.g., one or more dense machine learning layers, one or more fully connected machine learning layers, and/or the like) to generate the one or more dynamically generated parameters for the target machine learning model of the dynamically parameterized machine learning framework based at least in part on the output of the noted machine learning layers. The real-time parameter generation functionality of the encoder machine learning model may in some embodiments comprises processing the input features of a predictive input features using one or more machine learning layers (e.g., one or more dense machine learning layers, one or more fully connected machine learning layers, and/or the like) to generate the one or more dynamically generated parameters for the target machine learning model of the dynamically parameterized machine learning framework based at least in part on the output of the noted machine learning layers.

Accordingly, in some embodiments, the encoder machine learning model may comprise an embedding generation layer followed by a parameter generation layer. An operational example of such an encoder machine learning model 500 is depicted in FIG. 5. As depicted in FIG. 5, the encoder machine learning model 500 comprises an embedding generation layer 501 that is configured to process the input features 511 of a predictive input (e.g., a training predictive input) in order to generate an embedded representation 512 of the predictive input. The embedded representation 512 is then provided both to a parameter generation layer 502 of the encoder machine learning model 500 and an output generation layer 503 of the encoder machine learning model 500.

As further depicted in FIG. 5, the encoder machine learning model 500 further comprises the parameter generation layer 502 that is configured to receive the embedded representation 512 from the embedding generation layer 501 and process the embedded representation 512 to generate a dynamically generated parameter set 513. The dynamically generated parameter set 513 is then provided to the output generation layer 503 of the encoder machine learning model 500, where the output generation layer 503 is configured to combine the embedded representation 512 that is provided by the embedding generation layer 501 and the dynamically generated parameter set 513 that is provided by the parameter generation layer 502 in order to generate the encoder model output 514. Accordingly, the encoder model output 514 that is generated by the output generation layer 503 is determined based at least in part on (e.g., comprises) the embedded representation 512 that is provided by the embedding generation layer 501 and the dynamically generated parameter set 513 that is provided by the parameter generation layer 502.

At step/operation 403, the predictive data analysis computing entity 106 determines, based at least in part on an embedded representation of the training predictive input and using the target machine learning model of the dynamically parameterized machine learning framework whose parameters are determined based at least in part on the dynamically generated parameters provided by the encoder machine learning model, a target model output for the training predictive input. In some embodiments, the target machine learning model is a model characterized by a set of inputs and a set of parameters, where the set of inputs are determined based at least in part on the embedded representation that is generated by the encoder machine learning model and the set of parameters are determined based at least in part on the dynamically generated parameters that are generated by the encoder machine learning model. In some embodiments, the target machine learning model comprises a set of differential equation sub-models (e.g., each characterized by a differential equation term), where each differential equation sub-model takes at least one or more input features determined based at least in part on the embedded representation that is generated by the encoder machine learning model, and where each differential equation sub-model is characterized by a set of parameters that are determined based at least in part on a subset of the dynamically generated parameters that are generated by the encoder machine learning model.

In some embodiments, the target machine learning model comprises a biosimulator machine learning model, and the predictive output comprises a predicted biometric measurement for a monitored individual that is associated with the predictive input. In some embodiments, biosimulator machine learning models, which are also referred to herein as "biosimulators" predict observable outcomes of a broad range of biological systems encompassing, for example, models of physiological systems as well as epidemiological models of disease spread. Biosimulators may be valuable to payers as well as providers and researchers due to their ability to predict health states both at the individual and population levels. Biosimulators may be expressed as systems of differential equations. These differential equations may comprise variables and parameters. Variables may be of two types. Input variables tell the model about the conditions in which the model is being applied and are expected to change over time or under different circumstances. Output variables are those measurements predicted by the model. In addition to variables, models also comprise parameters. A parameter may be a value that, once established, is expected to remain relatively stable regardless of the input variables entered into the model. For models that are biosimulators, parameters, as well as the biosimulator outputs themselves, may be attributes of interest.

For example, a biosimulator may be designed to predict glucose levels of an individual through time as a function of input variables that quantify activities such as carbohydrate consumption and physical activity. The output of this model may be a predicted glucose level of the individual at a given time. Parameters of the model may include more stable physiological attributes of the individua such as insulin sensitivity (the amount or rate of glucose uptake triggered by a particular level of insulin) and beta cell capacity (the maximum amount of or rate at which insulin can be produced by the individua's pancreatic beta cells). Insulin sensitivity and beta cell capacity are relevant to issues such as progression towards and treatment of diabetes. Insulin sensitivity and beta cell capacity may change gradually over time, but not as quickly as variables such as carbohydrate consumption and exercise. For a given prediction, the biosimulator keeps insulin sensitivity and beta cell capacity fixed. In some embodiments, the parameters for biosimulators may be difficult and expensive to determine. To continue with the glucose biosimulator example, determining parameters from intravenous glucose clamp tests can be expensive, time-consuming, and extremely uncomfortable for those who undergo the procedure. The difficulty and expense lead to parameters that are determined with limited sample sizes. Additionally, the parameters may not be representative of individuals who have not undergone the clamp test. Mathematical techniques that attempt to determine numerous parameters by fitting to data samples often yield too many possible solutions (each a combination of parameters) to determine which, if any are the actual parameter values.

As illustrated by the above biosimulator examples, the target model output of a target machine learning model may be determined based at least in part on one or both of the output values provided by the target machine learning model and/or one or more optimizable parameters of the target machine learning model. For example, in some embodiments, a target machine learning model (e.g., or a sub-model of a target machine learning model) may be characterized by one or more dynamically generated parameters that are provided by the encoder machine learning model and one or more optimizable parameters that are generated by solving a system of differential equations based at least in part on the dynamically generated parameters as well as input features inferred based at least in part on the embedded representation provided by the encoder machine learning model. In some of the noted embodiments, the optimizable parameters may be at least a part of the target model output of the target machine learning model.

At step/operation 404, the predictive data analysis computing entity 106 determines, based at least in part on the target model output and using the decoder machine learning model of the dynamically parameterized machine learning framework, an inferred predictive input for the training predictive input. For example, the decoder machine learning model may be configured to process input features extracted from the target model output (and/or from the embedded representation of the predictive input, in some embodiments) using one or more statistically generated parameters and/or one or more dynamically generated parameters of the decoder machine learning model in order to generate the inferred predictive input, which may be a predictively reconstructed version of the inferred predictive input. For example, if the predictive input comprises a recorded biometric feature (e.g., a recorded blood pressure feature) for a monitored individual, the inferred predictive input may comprise a predicted biometric feature (e.g., a predicted blood pressure feature) for the monitored individual that is determined based at least in part on input features of the decoder machine learning model.

Accordingly, while various embodiments of the present invention describe that the input features for a decoder machine learning model of a dynamically parameterized machine learning framework are determined based at least in part on the target model output of a target machine learning model of the dynamically parameterized machine learning framework, a person of ordinary skill in the relevant technology will recognize that the input features of the decoder machine learning model may additionally or alternatively be determined based at least in part on the encoder model output of an encoder machine learning model of the dynamically parameterized machine learning framework. Moreover, while various embodiments of the present invention describe that the parameters of the decoder machine learning model of a dynamically parameterized machine learning framework are statistically determined during training of the dynamically parameterized machine learning framework, a person of ordinary skill in the relevant technology will recognize that at least some of the parameters of the decoder machine learning model may additionally or alternatively be dynamically generated; for example, at least some of the parameters of a decoder machine learning model of a dynamically parameterized machine learning framework may in some embodiments be generated by an encoder machine learning model of the dynamically parameterized machine learning framework, e.g., an encoder machine learning model that is configured to generate dynamically generated parameters both for the target machine learning model of the dynamically parameterized machine learning framework and for the decoder machine learning model of the dynamically parameterized machine learning framework.

In some embodiments, the decoder machine learning model of a dynamically parameterized machine learning framework has a similar architecture (e.g., number of layers, number of nodes within each layer, number of parameters, value of hyper-parameters, and/or the like) to the model architecture of an encoder machine learning model of the dynamically parameterized machine learning framework. In some embodiments, the decoder machine learning model of a dynamically parameterized machine learning framework has a different architecture (e.g., number of layers, number of nodes within each layer, number of parameters, value of hyper-parameters, and/or the like) relative to the model architecture of an encoder machine learning model of the dynamically parameterized machine learning framework. In some embodiments, the decoder machine learning model of a dynamically parameterized machine learning framework comprise one or more fully connected machine learning layers. In some embodiments, the decoder machine learning model of a dynamically parameterized machine learning framework comprise one or more dense connected machine learning layers.

At step/operation 405, the predictive data analysis computing entity 106 determines a deviation measure for the predictive input and the predictive input based at least in part on a similarity/difference/error measure for the predictive input and the inferred predictive input. As described above, in some embodiments, given n training predictive inputs where n>=1, training the dynamically parameterized machine learning framework can be performed by updating statistically generated parameters of the dynamically parameterized machine learning framework using in order to optimize one deviation measure (e.g., one error function) for all of the n training predictive inputs, or by updating statistically generated parameters of the dynamically parameterized machine learning framework using in order to optimize n deviation measures (e.g., n error functions) comprising a deviation measure for each of the n training predictive inputs. Accordingly, the deviation measure discussed herein may be determined based at least in part on the similarity/difference/error measure for the training predictive input and the corresponding inferred predictive input alone, or based at least in part on a set of similarity/difference/error measures for a set of training predictive inputs and the corresponding predictive inputs as a batch.

At step/operation 406, the predictive data analysis computing entity 106 updates one or more statistically generated parameters of the dynamically parameterized machine learning framework to optimize the deviation measure. In some embodiments, a statistically generated parameter of a machine learning model is determined during the training and is then fixed when performing predictive inferences using the trained machine learning model, the value of a dynamically generated parameter is not fixed after training. In some embodiments, statistically generated parameters of the dynamically parameterized machine learning framework comprise one or more statistically generated parameters of the encoder machine learning model of the dynamically parameterized machine learning framework and/or one or more statistically generated parameters of the dynamically parameterized machine learning framework. In some embodiments, statistically generated parameters of the dynamically parameterized machine learning framework comprise one or more statistically generated parameters of the encoder machine learning model of the dynamically parameterized machine learning framework, one or more statistically generated parameters of the target machine learning model of the dynamically parameterized machine learning framework, and/or one or more statistically generated parameters of the dynamically parameterized machine learning framework. Accordingly, in some embodiments, a target machine learning model may be associated with both statistically generated parameters and dynamically generated parameters.

The dynamically parameterized machine learning frameworks as generated in accordance with the described herein address technical challenges associated with efficiency and effectiveness of performing biometric/biosimulator predictive data analysis, and enable performing biometric/biosimulator predictive data analysis with a dynamically generated model that is able to capture the predictive behavior multiple machine learning models via using dynamically generated parameters as part of the computations of the noted dynamically generated model. Accordingly, by reducing the number of machine learning models that should be utilized to perform effective biometric/biosimulator predictive data analysis in relation to prediction windows having diverse user activity profiles, various embodiments of the present invention both: (i) improve the computational complexity of performing biometric/biosimulator predictive data analysis by reducing the need for parallel implementation of multiple machine learning models as well as normalizing the outputs of multiple machine learning models, and (ii) reduce the storage costs of performing biometric/biosimulator predictive data analysis by eliminating the need to store model definition data (e.g., model parameter data and/or model hyper-parameter data) for multiple machine learning models. Accordingly, by addressing the technical challenges associated with efficiency and effectiveness of performing biometric/biosimulator predictive data analysis, various embodiments of the present invention make substantial technical contributions to improving efficiency and effectiveness of performing biometric/biosimulator predictive data analysis and to the field of predictive data analysis generally.

Predictive Inference Operations

Once generated, the dynamically parameterized machine learning framework can be used to generate a predictive output for a predictive input. FIG. 6 is a flowchart diagram of an example process 600 for generating a predictive output for a predictive input by performing a predictive inference using a trained dynamically parameterized machine learning framework. Via the various steps/operations of the process 600, the predictive data analysis computing entity 106 can utilize a predictive output by both utilizing modeling configuration data that is gained during training of the dynamically parameterized machine learning framework as well as a real-time-generated modeling configuration data that is gained during a predictive inference and by utilizing a trained dynamically parameterized machine learning framework. In some embodiments, the process 600 is repeated through a number of iterations, with each iteration receiving a predictive input.

The process 600 begins at step/operation 601 when the predictive data analysis computing entity 106 identifies (e.g., receives) the predictive input. As described above, in some embodiments, a predictive input describes a combination of one or more input features that are provided as inputs to a dynamically parameterized machine learning framework. In some embodiments, the input features of a predictive input may include one or more health data features of a particular individual/patient, where the health data features can be extracted from natural language documents such as medical records, claims data, and similar health data; from one or more biometric sensors associated with the particular individual/patient, and/or the like. In some embodiments, training of a dynamically parameterized machine learning framework is performed using a deviation measure that is defined based at least in part on a similarity measure for a predictive input and for an inferred predictive input that is determined based at least in part on the output of processing the predictive input using the dynamically parameterized machine learning framework. In some embodiments, once trained, the dynamically parameterized machine learning framework is configured to process a predictive input in order to generate a predictive output (e.g., based at least in part on a target model output of a target machine learning model of the dynamically parameterized machine learning framework, based at least in part on a decoder model output of a decoder machine learning model of the dynamically parameterized machine learning framework, and/or the like).

At step/operation 602, the predictive data analysis computing entity 106 processes the predictive input using an encoder machine learning model of the dynamically parameterized machine learning framework in order to generate an encoder model output for the predictive input that comprises one or more dynamically generated parameters for a target machine learning model of the dynamically parameterized machine learning framework. In some embodiments, the encoder model output of the encoder machine learning model comprises an embedded representation of the predictive input and one or more dynamically generated parameters for the target machine learning model of the dynamically parameterized machine learning framework. In some of the noted embodiments, both the embedded representation and the one or more dynamically generated parameters are provided to the target machine learning model.

At step/operation 603, the predictive data analysis computing entity 106 determines, based at least in part on an embedded representation of the predictive input and using the target machine learning model of the dynamically parameterized machine learning framework whose parameters are determined based at least in part on the dynamically generated parameters provided by the encoder machine learning model, a target model output for the predictive input. In some embodiments, the target machine learning model is a model characterized by a set of inputs and a set of parameters, where the set of inputs are determined based at least in part on the embedded representation that is generated by the encoder machine learning model and the set of parameters are determined based at least in part on the dynamically generated parameters that are generated by the encoder machine learning model. In some embodiments, the target machine learning model comprises a set of differential equation sub-models (e.g., each characterized by a differential equation term), where each differential equation sub-model takes at least one or more input features determined based at least in part on the embedded representation that is generated by the encoder machine learning model, and where each differential equation sub-model is characterized by a set of parameters that are determined based at least in part on a subset of the dynamically generated parameters that are generated by the encoder machine learning model.

At step/operation 604, the predictive data analysis computing entity 106 determines the predictive output based at least in part on the target model output. As described above, the target model output of a target machine learning model may be determined based at least in part on one or both of the output values provided by the target machine learning model and/or one or more optimizable parameters of the target machine learning model. For example, in some embodiments, a target machine learning model (e.g., or a sub-model of a target machine learning model) may be characterized by one or more dynamically generated parameters that are provided by the encoder machine learning model and one or more optimizable parameters that are generated by solving a system of differential equations based at least in part on the dynamically generated parameters as well as input features inferred based at least in part on the embedded representation provided by the encoder machine learning model. In some of the noted embodiments, the optimizable parameters may be at least a part of the target model output of the target machine learning model.

For example, a biosimulator may be designed to predict glucose levels of an individual through time as a function of input variables that quantify activities such as carbohydrate consumption and physical activity. The output of this model may be a predicted glucose level of the individual at a given time. Parameters of the model may include more stable physiological attributes of the individua such as insulin sensitivity (the amount or rate of glucose uptake triggered by a particular level of insulin) and beta cell capacity (the maximum amount of or rate at which insulin can be produced by the individua's pancreatic beta cells). Insulin sensitivity and beta cell capacity are relevant to issues such as progression towards and treatment of diabetes. Insulin sensitivity and beta cell capacity may change gradually over time, but not as quickly as variables such as carbohydrate consumption and exercise. For a given prediction, the biosimulator keeps insulin sensitivity and beta cell capacity fixed.

At step/operation 605, the predictive data analysis computing entity 106 optionally determines, based at least in part on the target model output and using the decoder machine learning model of the dynamically parameterized machine learning framework, an inferred predictive input for the predictive input. For example, the decoder machine learning model may be configured to process input features extracted from the target model output (and/or from the embedded representation of the predictive input, in some embodiments) using one or more statistically generated parameters and/or one or more dynamically generated parameters of the decoder machine learning model in order to generate the inferred predictive input, which may be a predictively reconstructed version of the inferred predictive input. For example, if the predictive input comprises a recorded biometric feature (e.g., a recorded blood pressure feature) for a monitored individual, the inferred predictive input may comprise a predicted biometric feature (e.g., a predicted blood pressure feature) for the monitored individual that is determined based at least in part on input features of the decoder machine learning model.

At step/operation 606, the predictive data analysis computing entity 106 optionally updates the predictive output that is determined at step/operation 604 based at least in part on the inferred predictive input that is at least part of a decoder model output of the decoder machine learning model. For example, in some embodiments, the predictive data analysis computing entity 106 determines a deviation measure for the inferred predictive input and the predictive input, determines whether the deviation measure satisfies a deviation measure threshold, and, in response to determining that the framework validation score satisfies the framework score threshold, determines the predictive output based at least in part on the target model output. As another example, in some embodiments, the predictive data analysis computing entity 106 determines a deviation measure for the inferred predictive input and the predictive input, determines whether the deviation measure satisfies a deviation measure threshold, and, in response to determining that the framework validation score fails to satisfy the framework score threshold, does not determine the predictive output based at least in part on the target model output and sets a null value for the predictive output.

Accordingly, in some embodiments, the inferred predictive input that is generated by the decoder model output is used to "validate" the target model output of the target machine learning model during a predictive inference that is performed using a trained dynamically parameterized machine learning framework. In some embodiments, the predictive output describes the inferred predictive input (and/or other decoder model outputs of the decoder machine learning model), which may in some embodiments be deemed to be a "simplified" or "semantically enhanced" version of the model output.

Once generated, the predictive output may be used to perform one or more prediction-based actions, such as one or more health-related prediction-based actions. Exemplary prediction-based actions are described below with reference to a predictive output which is an insulin-glucose prediction.

For example, the predictive data analysis computing entity 106 may be configured to generate one or more physician alerts and/or one or more healthcare provider alerts based at least in part on the glucose-insulin predictions. As another example, the predictive data analysis computing entity 106 may be configured to generate one or more automated physician appointments, automated medical notes, automated prescription recommendations, and/or the like based at least in part on the glucose-insulin predictions. As yet another example, the predictive data analysis computing entity 106 may be configured to enable an end-user device to display a user interface, where the user interface has been generated based at least in part on the glucose-insulin predictions.

In some embodiments, generating the one or more glucose-insulin predictions comprises generating an insulin sensitivity prediction based at least in part on at least one of the maximal insulin secretion rate parameter values and the insulin secretion acceleration parameter value; and determining, based at least in part on the insulin sensitivity measure, an exogenous insulin need determination. In some of the noted embodiments, performing the one or more prediction-based actions comprises, in response to determining a positive exogenous insulin need determination, generating one or more automated medical alarms. In some of the noted embodiments, performing the one or more prediction-based actions comprises, in response to determining a positive exogenous insulin need determination, the predictive data analysis computing entity 106 causes an automated insulin delivery computing entity to perform an automated exogenous insulin injection into the bloodstream of the corresponding monitored enduser. In some of the noted embodiments, performing the one or more prediction-based actions comprises, in response to determining a positive exogenous insulin need determination, causing an automated medical response such as arrangement of ambulance services for the corresponding monitored end-user.

The predictive data analysis operations described herein address technical challenges associated with efficiency and effectiveness of performing biometric/biosimulator predictive data analysis, and enable performing biometric/biosimulator predictive data analysis with a dynamically generated model that is able to capture the predictive behavior multiple machine learning models via using dynamically generated parameters as part of the computations of the noted dynamically generated model. Accordingly, by reducing the number of machine learning models that should be utilized to perform effective biometric/biosimulator predictive data analysis in relation to prediction windows having diverse user activity profiles, various embodiments of the present invention both: (i) improve the computational complexity of performing biometric/biosimulator predictive data analysis by reducing the need for parallel implementation of multiple machine learning models as well as normalizing the outputs of multiple machine learning models, and (ii) reduce the storage costs of performing biometric/biosimulator predictive data analysis by eliminating the need to store model definition data (e.g., model parameter data and/or model hyper-parameter data) for multiple machine learning models. Accordingly, by addressing the technical challenges associated with efficiency and effectiveness of performing biometric/biosimulator predictive data analysis, various embodiments of the present invention make substantial technical contributions to improving efficiency and effectiveness of performing biometric/biosimulator predictive data analysis and to the field of predictive data analysis generally.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors and using a target model of a dynamically parameterized machine learning framework, a predictive output for a predictive input, wherein the dynamically parameterized machine learning framework comprises (i) an encoder machine learning model and a decoder machine learning model that comprise a plurality of statistically generated parameters and (ii) the target model, which comprises an initial plurality of dynamically generated parameters, wherein (a) the plurality of statistically generated parameters is fixed after training of the dynamically parameterized machine learning framework, (b) the initial plurality of dynamically generated parameters is updated during a plurality of processing iterations of the dynamically parameterized machine learning framework, (c) the plurality of processing iterations comprises a training processing iteration and an inferential processing iteration, and (d) and wherein generating the predictive output comprises:
determining, using the encoder machine learning model, one or more dynamically generated parameters for the target model based at least in part on the predictive input,
updating the initial plurality of dynamically generated parameters based on the one or more dynamically generated parameters without updating the plurality of statistically generated parameters,
determining, using the target model, and based at least in part on the one or more dynamically generated parameters, a target model output for the predictive input, and
determining the predictive output based at least in part on the target model output; and
initiating, by the one or more processors, one or more prediction-based actions based at least in part on the predictive output.

2. The computer-implemented method of claim 1, wherein:
the encoder machine learning model is further configured to determine an embedded representation of the predictive input, and
the target model is determined based at least in part on the embedded representation and the one or more dynamically generated parameters.

3. The computer-implemented method of claim 2, wherein:
the target model is characterized by one or more differential equation sub-models; and
a differential equation sub-model of the one or more differential equation sub-models is characterized by one or more input features that are extracted based at least in part on an output of the encoder machine learning model and by a one or more of the one or more dynamically generated parameters.

4. The computer-implemented method of claim 1, wherein:
the target model comprises a biosimulator machine learning model, and
the predictive output comprises a predicted biometric measurement for a monitored individual that is associated with the predictive input.

5. The computer-implemented method of claim 4, wherein determining the predictive output comprises:
determining, using the decoder machine learning model of the dynamically parameterized machine learning framework and based at least in part on the target model output, an inferred predictive input for the predictive input; and
determining the predictive output based at least in part on the inferred predictive input.

6. The computer-implemented method of claim 5, wherein determining the predictive output comprises:
determining a deviation measure for the inferred predictive input and the predictive input;
determining that the deviation measure satisfies a deviation measure threshold;
in response to determining that the deviation measure satisfies the deviation measure threshold, determining the predictive output based at least in part on the target model output.

7. The computer-implemented method of claim 5, wherein a plurality of trained parameters of the dynamically parameterized machine learning framework is generated using a training routine that is configured to minimize a deviation measure for one or more training predictive inputs and one or more inferred predictive inputs that are generated by the dynamically parameterized machine learning framework based at least in part on the one or more training predictive inputs.

8. The computer-implemented method of claim 7, wherein the plurality of trained parameters comprises one or more encoder model parameters of the encoder machine learning model or one or more decoder model parameters of the decoder machine learning model.

9. A system comprising:
one or more processors; and
at least one memory storing processor-executable instructions that, when executed by any one or more of the one or more processors, cause the one or more processors to perform operations comprising:

generating, using a target model of a dynamically parameterized machine learning framework, a predictive output for a predictive input, wherein the dynamically parameterized machine learning framework comprises (i) an encoder machine learning model and a decoder machine learning model that comprise a plurality of statistically generated parameters and (ii) the target model, which comprises an initial plurality of dynamically generated parameters, wherein (a) the plurality of statistically generated parameters is fixed after training of the dynamically parameterized machine learning framework, (b) the initial plurality of dynamically generated parameters is updated during a plurality of processing iterations of the dynamically parameterized machine learning framework, (c) the plurality of processing iterations comprises a training processing iteration and an inferential processing iteration, and (d) and wherein generating the predictive output comprises:

determining, using the encoder machine learning model, one or more dynamically generated parameters for the target model based at least in part on the predictive input, updating the initial plurality of dynamically generated parameters based on the one or more dynamically generated parameters without updating the plurality of statistically generated parameters, determining, using the target model and based at least in part on the one or more dynamically generated parameters, a target model output for the predictive input, and determining, the predictive output based at least in part on the target model output; and initiating one or more prediction-based actions based at least in part on the predictive output.

10. The system of claim 9, wherein:

the encoder machine learning model is further configured to determine an embedded representation of the predictive input, and the target model is determined based at least in part on the embedded representation and the one or more dynamically generated parameters.

11. The system of claim 10, wherein:

the target model is characterized by one or more differential equation sub-models; and a differential equation sub-model of the one or more differential equation sub-models is characterized by one or more input features that are extracted based at least in part on an output of the encoder machine learning model and by one or more of the one or more dynamically generated parameters.

12. The system of claim 9, wherein:

the target model comprises a biosimulator machine learning model, and the predictive output comprises a predicted biometric measurement for a monitored individual that is associated with the predictive input.

13. The system of claim 12, wherein determining the predictive output comprises:

determining, using the decoder machine learning model of the dynamically parameterized machine learning framework and based at least in part on the target model output, an inferred predictive input for the predictive input; and determining the predictive output based at least in part on the inferred predictive input.

14. The system of claim 13, wherein determining the predictive output comprises:

determining a deviation measure for the inferred predictive input and the predictive input;

determining that the deviation measure satisfies a deviation measure threshold;

in response to determining that the score deviation measure satisfies the deviation measure threshold, determining the predictive output based at least in part on the target model output.

15. The system of claim 13, wherein a plurality of trained parameters of the dynamically parameterized machine learning framework is generated using a training routine that is configured to minimize a deviation measure for one or more training predictive inputs and one or more inferred predictive inputs that are generated by the dynamically parameterized machine learning framework based at least in part on the one or more training predictive inputs.

16. The system of claim 15, wherein the plurality of trained parameters comprises one or more encoder model parameters of the encoder machine learning model or one or more decoder model parameters of the decoder machine learning model.

17. One or more non-transitory computer-readable storage media including instructions that, when executed by one or more processors, cause the one or more processors to:

generate, using a target model of a dynamically parameterized machine learning framework, a predictive output for a predictive input, wherein the dynamically parameterized machine learning framework comprises (i) an encoder machine learning model and a decoder machine learning model that comprise a plurality of statistically generated parameters and (ii) the target model, which comprises an initial plurality of dynamically generated parameters, wherein (a) the plurality of statistically generated parameters is fixed after training of the dynamically parameterized machine learning framework, (b) the initial plurality of dynamically generated parameters is updated during a plurality of processing iterations of the dynamically parameterized machine learning framework, (c) the plurality of processing iterations comprises a training processing iteration and an inferential processing iteration, and (d) and wherein generating the predictive output comprises:

determining, using the encoder machine learning model one or more dynamically generated parameters for the target model based at least in part on the predictive input;

updating the initial plurality of dynamically generated parameters based on the one or more dynamically generated parameters without updating the plurality of statistically generated parameters, determining, using the target model and based at least in part on the one or more dynamically generated parameters, a target model output for the predictive input, and determining the predictive output based at least in part on the target model output; and initiating one or more prediction-based actions based at least in part on the predictive output.

* * * * *

UNITED STATES PATENT AND TRADEMARK OFFICE
CERTIFICATE OF CORRECTION

PATENT NO. : 12,456,059 B2  
APPLICATION NO. : 17/484571  
DATED : October 28, 2025  
INVENTOR(S) : Irfan Bulu et al.

Page 1 of 1

It is certified that error appears in the above-identified patent and that said Letters Patent is hereby corrected as shown below:

In the Claims

In Column 30, Line 20, Claim 3, delete "by a one" and insert -- by one --, therefor.

In Column 32, Line 9, Claim 14, delete "the score deviation" and insert -- the deviation --, therefor.

Signed and Sealed this  
Third Day of February, 2026

John A. Squires  
*Director of the United States Patent and Trademark Office*